2,819,050
CHECK VALVE FOR RECTIFYING COLUMN

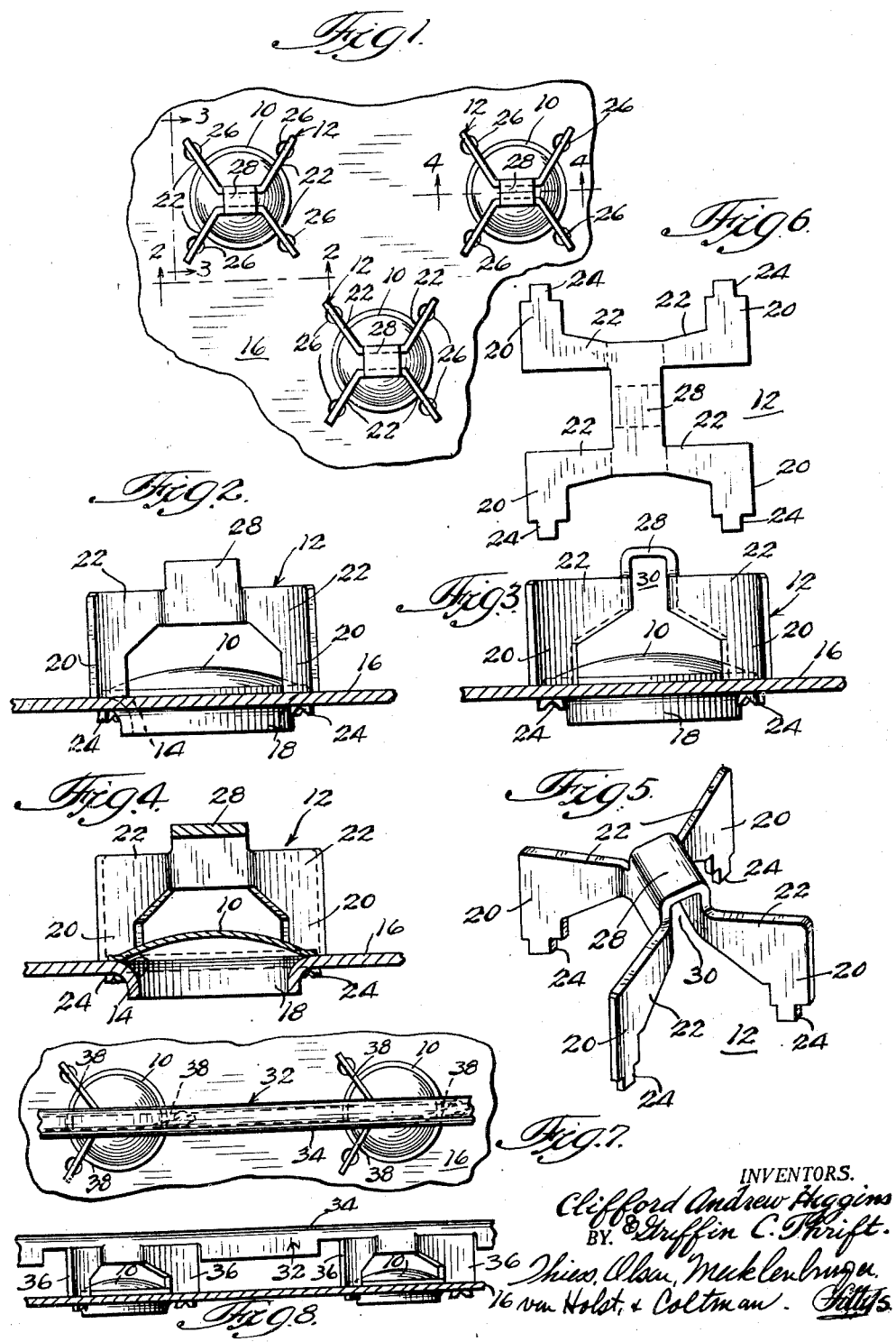

Clifford Andrew Huggins and Griffin C. Thrift, Wichita, Kans., assignors to Koch Engineering Company, Inc., Wichita, Kans., a corporation of Kansas Application May 11, 1955, Serial No. 507,568

4 Claims. (Cl. 261—114)

The present invention relates to an improved check valve for use in rectifying columns or similar contact apparatus, and this application is a continuation-in-part of Huggins and Thrift co-pending application Serial No. 414,578, filed March 8, 1954, issued November 27, 1956, as Patent No. 2,772,080.

In order to better appreciate the contribution of the present invention to the art, the following background should be borne in mind. In the gas-liquid contact or rectification art, bubble plate towers and sieve plate towers have been extensively used in large-scale commercial operations. It is well recognized by those skilled in the art that sieve plate towers operate satisfactorily only over limited ranges of vapor and liquid rates of flow if draining through plate perforations is to be avoided. In addition, sieve plates must be maintained in proper level alignment at all times if efficient operation is to be assured. Bubble caps, because of their detailed construction, require frequent cleaning and have limited flexibility at high liquid-vapor ratios. As is the case with sieve plates, the level positioning of the bubble plate is essential to insure efficient vapor-liquid contact.

The check valve construction provided by this invention obviates the above and other disadvantages found in sieve plate and bubble cap plate towers and operates at efficiencies approximating those of a perforated plate while retaining operating ranges exceeding those of bubble plates in the course of attaining the following objects.

It is an object of this invention to provide a check valve construction which offers negligible resistance to the flow of liquid across the plate surface thereby eliminating vapor maldistribution due to a hydraulic gradient.

It is another object of this invention to provide a check valve construction in which all parts may be readily fabricated from sheet metal blanks.

It is a further object of this invention to provide a check valve construction whereby the highest velocity vapors of the gases passing therethrough are directed horizontally rather than vertically, thereby greatly reducing the "coning" difficulties prevalent in sieve plate operation.

It is still another object of this invention to provide a check valve construction which is operable over an exceedingly wide range of column conditions.

These and other objects will become more manifest from the description, the drawings, and the appended claims.

In one embodiment of the invention a check valve structure for use in a rectifying column is provided which utilizes the peripheries of the apertures in the column plates as valve seats, and concavo-convex discs as closure members. In the normal course of operation, gaseous pressure from beneath the plates lifts the discs from their seats. Retaining means are provided for each disc, limiting the upward travel thereof and assuring return of the disc to its seat. The retaining means comprises a four-posted spider affixed to the tray. The spider is plate stamped and suitably bent prior to being fixedly clinched to the bottom plate surface in a single stroke upsetting operation. The disc retaining means possesses a novel design which offers minimum resistance to the flow of liquid across the plate surface in the normal course of column operation, as will hereinafter be explained in greater detail.

For a more complete understanding of this invention, reference will now be made to the drawings, wherein Figure 1 is a top plan view of the valve members, which comprise the essence of this invention, arranged on a plate fragment;

Fig. 2 is a side, elevational view taken on the line 2—2 of Figure 1 and on a scale enlarged thereover;

Fig. 3 is a front, elevational view taken on line 3—3 of Figure 1 and on a scale enlarged thereover;

Fig. 4 is a transverse, sectional view taken on line 4—4 of Figure 1 and on a scale enlarged thereover;

Fig. 5 is a perspective view of the disc retaining component of the provided valve structure;

Fig. 6 is a plan view of a sheet metal blank from which the retaining means illustrated in Fig. 5 is formed;

Fig. 7 is a top plan view of a modified form of disc retaining means; and

Fig. 8 is a side, elevational view of the embodiment illustrated in Fig. 7.

The top plan view illustrated in Fig. 1 discloses the relationship between a valve disc or closure member 10 and a surmounted disc retaining means 12. As will be more clearly seen in Fig. 4, the disc seats for the valve discs 10 comprise peripheries 14 of apertures which are formed in a rectifying column plate or deck 16. It will be further noted from Fig. 2 that the decks 16 have downwardly depending lip portions 18 which define the apertures through which vapors rise. It is apparent that the projecting lip portions 18 materially strengthen the deck 16, preventing bending or buckling thereof. The vapors rise through the apertured decks and raise the disc members 10 from their seats 14, in the course of countercurrently contacting liquid which is flowing downwardly through the column and transversely across the deck 16. Four posts or leg members 20 of the retaining means 12 slidably engage the periphery of each disc 10 in the course of the latter member's opening and closing movements. The upward extent of the disc travel is governed by the vertical height of the legs 20 which extends from the deck surface to the juncture of the vertical legs 20 with angularly disposed arms 22. Upon cessation of the vapor flow, the discs 10 are guided to their seats 14 on the deck 16 by the legs 20.

No gaskets are needed to effect a liquid seal and prevent downward flow of the liquid on the top surfaces of the decks through the deck apertures, since even at the lowest loadings vapor weeps up through any crevice.

The facile and ready manner in which the disc retaining means illustrated in Fig. 5 is formed may be appreciated by noting the sheet metal blank illustrated in Fig. 6. The blank in Fig. 6 may be readily stamped from sheet metal stock and bent along the dotted lines to form the retaining means, illustrated in Figs. 1 through 4. After having bent the blank of Fig. 6 into the retaining means configuration shown in perspective in Fig. 5, reduced terminal portions 24 of the legs 20 are inserted in deck apertures 26, illustrated in Fig. 1, and fixedly clinched to the bottom deck surface by means of a simple upsetting operation. Following the upsetting operation, the straight line end limit of each terminal leg portion 24 will be deformed resulting in a terminal end limit having a V-shaped notch therein, such as is illustrated in Figs. 2 through 4, inclusive.

It is thus seen that the retaining means 12 may be readily and economically fabricated, as it comprises a unitary member which is readily stamped from sheet metal stock and readily formed into the final retaining means configuration. The attachment of the retaining means to the deck 16 is accomplished in a single-stroke upsetting operation in which the four reduced terminal leg portions 24 of the retaining means 12 are fixedly clinched to the undersurface of the deck 16.

In the normal course of operation in a rectifying column utilizing the check valve construction provided by this invention, vapors rising from below enter apertures defined by the depending lip portions 18. The disc closure members 10 are removed upwardly from their seats 14 and maintained in the elevated position at the juncture in the retaining means between the vertical legs 20 and the angularly disposed arms 22. While in the elevated position, vapors rising from below impinge against the lower surface of the discs 10 and are dispersed horizontally to rise through the liquid positioned on the surface of the deck 16. It is an important feature of the illustrated check valve construction that the highest vapor velocity is directed horizontally rather than vertically. As a result of the horizontal dispersion of the rising vapors "coning," or blowing dry, a difficulty prevalent in sieve plate operation, is greatly reduced. It is thus apparent that high velocity in the rising vapors exists only at deck level, at which point the vapors are submerged in liquid. Before emerging from the top surface of the liquid positioned on the upper surface of the deck 16, the vapors will be finely dispersed and evenly distributed, assuring uniform and efficient vapor-liquid contact.

In the usual rectifying tower operation, the downwardly flowing liquid travels from side to side in opposed directions on successive plates. When bubble plates are utilized, a definite hydrostatic head between the liquid entrance and exit to the plate is required to overcome the resistance set up by the cap arrangement across which the flowing liquid must travel. As a result of this hydrostatic gradient, it may occur that no vapor will pass through the bubble caps positioned near the liquid entrance to the plate. As a result, the rising vapors will be forced to pass through the remaining caps resulting in overloading of these latter caps and possible column flooding. However, utilizing the check valve construction presented, since the maximum height of any portion of the provided check valve is approximately one inch, negligible obstruction to liquid flow across the deck surface exists. Consequently, any vapor maldistribution through the check valves arranged on the deck due to any hydraulic gradient is substantially nil.

Referring now, more particularly, to Fig. 3, it will be noted that the retaining means arms 22 connect the vertical supporting legs of the retaining means 12 to a centrally disposed channel-like bight portion 28 which in the illustrated embodiment has a ceiling portion joining opposed parallel wall portions. The channel passageway 30, defined by the bight portion 28, is positioned parallel to the flow of fluid across the deck surface 16. As a result, resistance to the liquid flow is considerably reduced and the column efficiency is increased.

Referring now to Figs. 7 and 8, a modified form of retaining means is illustrated in which the retaining means for a plurality of disc members 10 which are aligned on a deck surface may be fabricated from a single integral blank. Retaining means 32, illustrated in Figs. 7 and 8, comprises a longitudinal bight portion 34 from which three retaining leg members 36 depend for guiding the movement of each disc 10 from its seat.

It will also be appreciated that the longitudinal bight portion 34 also describes a longitudinal passageway through which liquid may flow in the course of its movement across the tray surface, thereby maintaining resistance to fluid flow at a minimum. Three leg members 36 which guide each disc 10, illustrated in Figs. 7 and 8, are connected to the longitudinal bight portion 34 by means of angularly disposed arms 38. As is apparent from Fig. 7, only three legs are needed to adequately retain the disc 10 in proper engagement with its seat 14. The legs 36 are clinched to the undersurface of supporting deck 16 in a manner similar to that previously explained with reference to the retaining means 12.

It will be noted that, by forming the retaining means 12 so that the two vertical legs 20 farther from the liquid entrance to the deck 16 are higher than the two leg members 20 closer to the liquid entrance, the disc 10, in the raised position, will assume an angular position, whereby a greater vapor discharge will emerge from that portion of the valve opening disposed toward the liquid discharge end of the deck 16. As a result of this greater vapor discharge at one valve end portion, the liquid which flows across the deck from the fluid entrance to the fluid exit of the plate will receive an added impetus and flow thereacross will be assisted and accelerated. In addition, the discs 10 may vary in weight on any given tray. Consequently, at low operating loads uniform vapor distribution through the decks, even though they be installed out of level, is assured, since the discs 10 will uniformly rise from their seats on the deck surface area despite the difference in liquid head on various deck portions. While these particular features are not shown in the drawings, they are presented in said co-pending application Serial No. 414,578, now Patent No. 2,772,080.

It is thus apparent that a novel check valve construction for use in a contacting device has been provided which may be readily fabricated and which offers little resistance to fluid flow across a deck surface so that the presence of a hydraulic gradient is substantially nil. The check valve may be constructed from any material resistant to the liquid-vapor components to be utilized therewith. In addition, the construction provided allows added impetus to be given to the flowing liquid if so desired. Furthermore, uniform vapor distribution may be assured at low loads even though the tray surface may be installed in a nonlevel position. The check valve presented is extremely flexible and will efficiently operate under greatly varying conditions. At low vapor loads, uniform distribution of the rising vapors through the check valves is assured and liquid runback or drainage through the deck apertures is obviated, since at the lowest loads vapor will weep up through any crevice regardless of the weir setting which regulates the height of fluid on a plate surface. At high loadings, when the valves 10 are removed from the seats and abut the juncture of the arms 22 and the vertical legs 20 of the retaining means, the deck functions somewhat similarly to a bubble plate, save that no obstruction to liquid flow exists and the vertical vapor velocity is relatively low, above the contacting zone, thereby adding to the efficiency of the contacting engagement between the gas and the liquid.

It is apparent from the illustrated embodiments of this invention that many modifications may be made therein which will still remain within the ambit of the basic inventive concept herein presented. The invention provided is to be limited, therefore, only by the scope of the appended claims.

We claim:

1. A check valve construction for use in a rectifying tower having a predeterminately apertured plate across which liquid flows, comprising a valve seat formed integral with such plate, reciprocally movable closure means surmounted on said valve seat and removable therefrom by gaseous pressure exerted from beneath such plate, and retaining means limiting the movement of said closure means from said seat, said retaining means comprising a spider member having a plurality of supporting posts, each of said posts having a reduced terminal end portion insertable in a plate aperture, said end portions being of sufficient length to traverse such plate thickness, converging arm members angularly disposed to said posts, a channel portion joining said arm members, said channel portion having a passageway disposed parallel to the normal flow of fluid across such plate surface whereby fluid may flow therethrough and resistance to fluid flow across the plate surface is maintained at a minimum.

2. A check valve construction for use with an apertured rectifying tower plate across which liquid flows in the normal course of operation comprising a concavo-convex closure member liftable from the periphery of one of such plate apertures by gaseous pressure exerted from beneath such plate, a unitary spider suitably affixed to such plate, said spider comprising a plurality of post members equi-spaced about one of such plate apertures, transverse arm members angularly disposed to said post members, a channel portion joining said arm members, said channel portion having a substantially inverted U-shaped cross sectional configuration, said channel being positioned in a plane parallel to the flow of liquid across such plate whereby a minimum of resistance will be presented by said valve to said liquid flow.

3. Retaining means for a check valve adapted for use with a rectifying tower plate across which liquid flows in the normal course of operation, said retaining means comprising a plurality of posts adapted for supporting said retaining means and securing the same to such plate on which positioned, retaining means arm portions angularly disposed to each of said posts, a channel comprising two parallel walls joined by a connecting channel ceiling portion, said arm members engaging the opposed wall portions of said channel, said retaining means being disposed on such rectifying tower plate so as to be disposed parallel to the flow of liquid thereacross whereby such fluid may flow between the opposed walls of said channel and the resistance to the flow of fluid across such plate afforded by said retaining means is maintained at a minimum.

4. A check valve construction for use in a rectifying tower having a predeterminately apertured plate across which liquid flows, comprising a valve seat formed integrally with such plate, reciprocally movable closure means surmounted on said valve seat and removable therefrom by gaseous pressure exerted from beneath such plate, and retaining means limiting the movement of said closure means from said seat, said retaining means comprising a spider member having a plurality of supporting posts, each of said posts having a reduced terminal end portion insertable in a plate aperture, said end portions being of sufficient length to traverse such plate thickness, converging arm members angularly disposed to said posts, a channel portion joining said arm members, said channel portion comprising an elongate passageway of uniform cross section, said passageway being disposed parallel to the normal flow of liquid across said plate surface whereby liquid may flow therethrough and resistance to liquid flow across the plate surface is maintained at a minimum.

References Cited in the file of this patent

UNITED STATES PATENTS

| | | |
|---|---|---|
| 1,047,807 | Hine | Dec. 17, 1912 |
| 2,016,390 | Richardson | Oct. 8, 1935 |
| 2,428,889 | Nutter | Oct. 14, 1947 |
| 2,622,615 | Golden et al. | Dec. 23, 1952 |
| 2,649,277 | Blackford | Aug. 18, 1953 |
| 2,718,900 | Nutter | Sept. 27, 1955 |

FOREIGN PATENTS

| | | |
|---|---|---|
| 619,029 | France | Dec. 23, 1926 |